United States Patent
Martinez et al.

(10) Patent No.: US 7,707,546 B2
(45) Date of Patent: Apr. 27, 2010

(54) SOURCE CODE INTERFACE

(75) Inventors: Anthony Edward Martinez, Spicewood, TX (US); Michael D. Rahn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2466 days.

(21) Appl. No.: 09/951,950

(22) Filed: Sep. 13, 2001

(65) Prior Publication Data

US 2003/0051228 A1  Mar. 13, 2003

(51) Int. Cl.
- G06F 9/44 (2006.01)
- G06F 3/00 (2006.01)
- G06F 3/048 (2006.01)
- G09G 5/02 (2006.01)

(52) U.S. Cl. .............. 717/109; 717/105; 717/113; 345/594; 715/762; 715/763; 715/764

(58) Field of Classification Search ......... 717/100–120; 345/962, 963
See application file for complete search history.

(56) References Cited

U.S. PATENT DOCUMENTS

| 5,644,334 | A | * | 7/1997 | Jones et al. ............ 345/419 |
| 5,889,951 | A | | 3/1999 | Lombardi ............ 395/200.49 |
| 5,986,662 | A | | 11/1999 | Argiro et al. ............ 345/424 |
| 6,055,522 | A | | 4/2000 | Krishna et al. ............ 705/517 |
| 6,247,020 | B1 | * | 6/2001 | Minard ............ 707/104.1 |
| 6,286,132 | B1 | * | 9/2001 | Tanaka et al. ............ 717/125 |
| 6,330,008 | B1 | * | 12/2001 | Razdow et al. ............ 345/772 |

* cited by examiner

*Primary Examiner*—Chuck O Kendall
(74) *Attorney, Agent, or Firm*—David A. Mims, Jr.; William Steinberg; Robert V. Wilber

(57) ABSTRACT

A method and implementing system are provided in which a user is enabled to view source code within a context of the screen presentation which is created by the source code. In an exemplary embodiment, a graphical user interface (GUI) is selectively overlaid upon a content screen display. The GUI displays markers to indicate beginning and ending points of source code elements for screen areas which are proximate to the hot-spot area in the GUI. Where a marker indicates additional code is present, the user is enabled to select the marker and a detailed presentation of the related source code is presented.

21 Claims, 6 Drawing Sheets

```
<a href=http://weather.yahoo.com/forecast/Austin_TX_US_f.html><small>Austin, TX</small></a>
```

SOURCE CODE INTERFACE

FIELD OF THE INVENTION

The present invention relates generally to information processing systems and more particularly to a methodology and implementation for viewing and manipulating source code for displayed information.

BACKGROUND OF THE INVENTION

The analysis and development of software which is used to effect the presentation of content or information on a display screen has been a difficult task. A great many iterations of code writing, program execution, screen viewing, debugging and code modification or editing have been required in order to produce a high quality product. As a developer is viewing displayed information, it is often necessary to "look beneath the surface" in order to understand how the underlying code creates the presentation being analyzed. For example, a web developer may wish to understand how a particular element of a page has been coded in hyper-text markup language (HTML) to make it look as it does in a browser window.

Currently, there are several ways to achieve this goal with available mechanisms, but they are cumbersome, and involve multiple steps and involve a temporary but time consuming loss of screen-to-code orientation. For example, by using the VIEW then SOURCE commands available in browser programs, the complete HTML code is revealed. Typically for a simple webpage presentation, the underlying code may comprise ten or more pages of HTML. When a developer finds a screen presentation area which the developer wishes to modify, the location of the relevant code must be determined within the pages of code used to create the screen display. When the developer finds the relevant code element, it is often difficult to relate the relevant code to the display orientation. The developer must then perform another search in order to become re-oriented with respect to the content of interest. That manual mode switching from one rendition to another is cognitively taxing and contributes to overall loss of performance.

Thus, there is a need for an improved methodology and implementing system which enables a user to more easily relate display screen presentation areas with the source code underlying such screen displays.

SUMMARY OF THE INVENTION

A method and implementing system are provided in which a user is enabled to view source code within a context of the screen presentation which is created by the source code. A user by pointing to or otherwise indicating a selected screen display element, is enabled to view the source code segment which causes the presentation of the selected displayed element. In one exemplary embodiment, a graphical user interface (GUI) is selectively overlaid upon a content screen display. The GUI includes a translucent area through which a user is able to view screen content underlying the GUI in order to maintain a visual relationship and orientation between selected screen content and related underlying source code. The GUI also includes a "hot spot" highlighted area. A user is enabled to manipulate the GUI and the hot-spot contained therein to areas of interest on the screen being displayed. The GUI displays markers to indicate beginning and ending points of source code elements for screen areas which are proximate to the hot-spot area in the GUI. Where a marker indicates additional code is present, the user is enabled to select the marker and a detailed presentation of the related source code is presented. The user is further enabled to select from the GUI one or more of a series of functions which may be performed on the underlying source code in order to effect desired changes in the related screen display areas.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
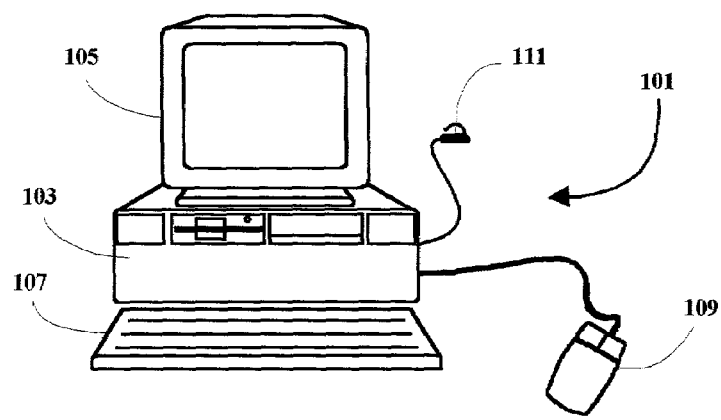
FIG. 1 is a diagram of a computer system in which the present invention may be implemented.

The various methods discussed herein may be implemented within a typical computer system which may include a workstation or personal computer. In general, an implementing computer system may include a plurality of processors in a multi-bus system in a network of similar systems. However, since the workstation or computer system implementing the present invention in an exemplary embodiment, is generally known in the art and composed of electronic components and circuits which are also generally known to those skilled in the art, circuit details beyond those shown in the drawings are not specified to any greater extent than that considered necessary as illustrated, for the understanding and appreciation of the underlying concepts of the present invention and in order not to obfuscate or distract from the teachings of the present invention.

In FIG. 1, a computer system 101 includes an electronics enclosure 103 which is typically arranged for housing one or more CPUs (central processing units) along with other component devices and subsystems of the computer system 101. The computer system 101 also includes a monitor or display unit 105, a keyboard 107 and a mouse or pointing device 109, which are all interconnected within the illustrated computer system. Also shown is a connector 111 which is arranged for connecting a modem within the computer system to a communication line such as a telephone line in the present example. The present invention may also be implemented in a cellular system without the connector 111.

Figure 2:
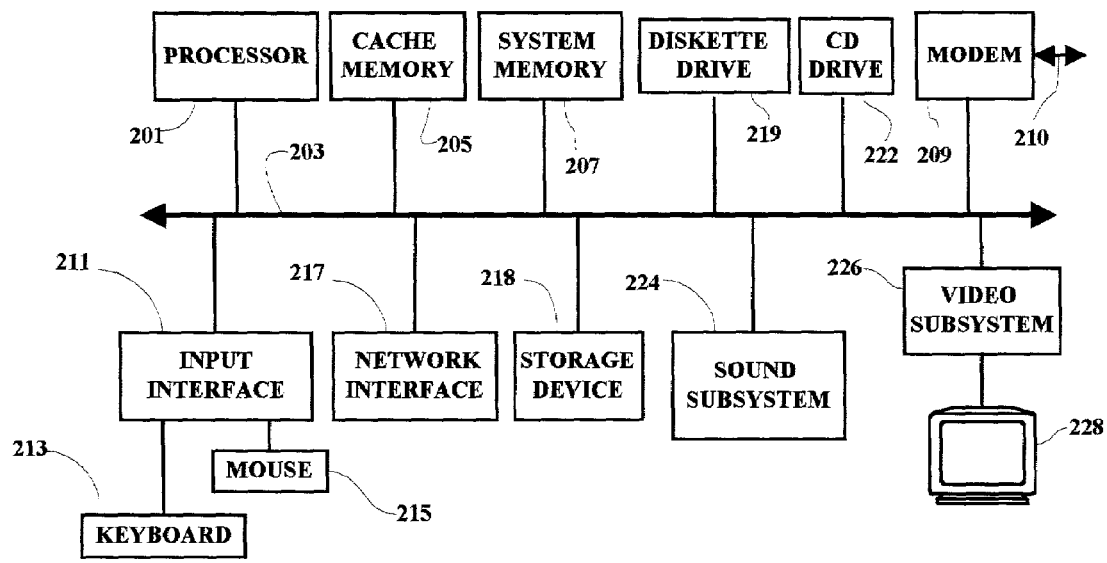
FIG. 2 is a simplified schematic diagram showing selected components and subsystems of the computer system illustrated in FIG. 1.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit 207 are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a separate network subsystem interface 217, a diskette drive unit 219 and a CD drive 222. A video subsystem 226, which may include a graphics subsystem, is connected to a display device 228. A sound subsystem 224 is shown connected to the system bus 203 and a storage device 218, which may comprise a hard drive unit or CD ROM, is also coupled to the bus 203. The diskette drive unit 219 provides a means by which individual diskette programs may be loaded on to the hard drive, or accessed directly, for selective execution by the computer system 101. As is well known, program diskettes or CDs containing application programs represented by magnetic or optical indicia on the diskette or CD, or programs in system memory, or acquired through a local network or through the world wide web may be read to provide program signals. Such program signals are selectively effective to cause the computer system to present displays on the screen of a display device and respond to user inputs in accordance with the functional flow of the application program being executed.

The source code GUI of the present invention may be implemented in many ways including an implementation within a browser program or as a stand-alone program. In the exemplary embodiment, the source code GUI is illustrated as being called from a browser program although it is understood that the GUI may also be initiated from a stand-alone application.

A browser program or application is selectively operable to access a website as is well known. After a user has started-up the system, and is actively running a browser program, a series of screens will be displayed to the user on the display device 221. Each screen typically has one or more selections for the user to make in navigating through the program. In general, a user will make selections from a display screen using the keyboard 213 or the mouse or pointer device 215. In an Internet operating program, the selections made by the user will determine "where" the user "goes", i.e. to what "website" or "webpage", and also, in some cases, the communications link or the path taken to get to the site selected.

Figure 3:
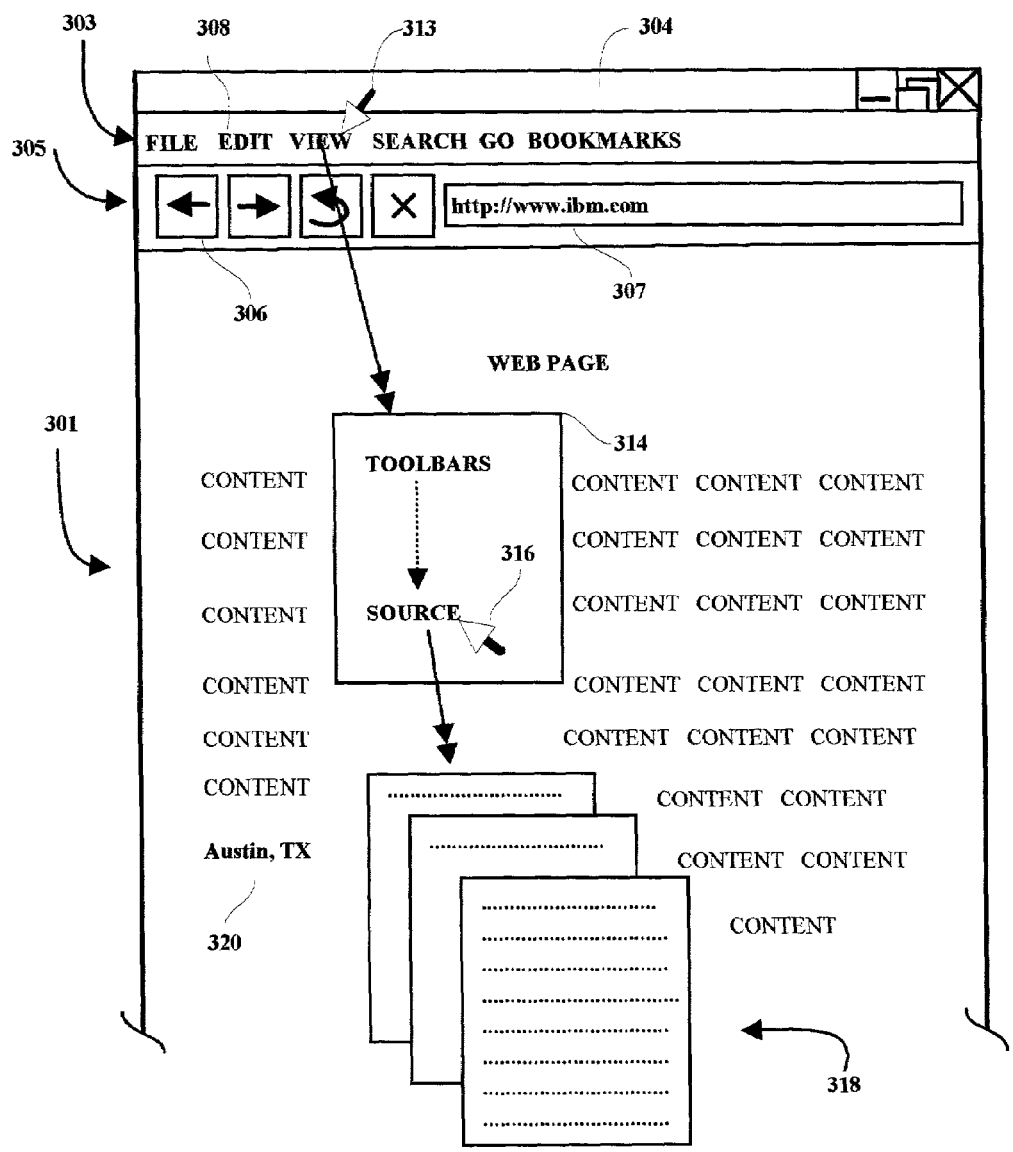
FIG. 3 is an illustration of an exemplary display screen of a typical web page for reference in explaining the present invention.

FIG. 3 illustrates a typical browser program screen display 301 in an Internet operating session. The browser screen generally includes a first menu bar 303 which displays several different modes which the user may select such as the "Edit" selection 308 and the "Bookmarks" selection 304. Another menu bar 305 may be displayed to help a user quickly move through documents, sites, or pages in a network application. An address or "location" section 307 enables a user to key-in, and also displays the name of, an internet address of a site to be, or being, visited. Other quick access buttons may be implemented on the screen for quick access to other selected network services and/or network functions. In general, any of the illustrated items may be selected through a "point and click" methodology associated with the mouse device 215, and a cursor or pointer indicium 313 visible on the display screen. For example, a download of data from a remote site may be immediately terminated during the transmission by pointing to the "Stop" button "X" and clicking on a designated mouse button. Similarly, the "Back" and "Forward" arrow buttons may be used to return to the last screen display or go forward to the next screen display, respectively.

In the FIG. 3 example, the "location" or "URL (uniform resource locator) designation is illustrated as "http://www.ibm.com". As is well known, hyperlinks typically comprise a word or grouping of descriptive words which if selected by a user through the positioning and clicking of a pointer will access the page or site which is designated by the link. The hyperlinks activate an access program to the selected site, unlike plain text on the page which merely represents text only without any functional aspect. Through the use of hyperlinks, a user may relatively quickly identify a possible site of interest and click on the hyperlink to immediately access that site from the current page.

As shown in the FIG. 3 example, when the pointer 313 is clicked on the "VIEW" selection on the menu bar 303, a "pop-up" window 314 appears which lists various additional selections. If the pointer then selects 316 the "SOURCE" selection, which indicates that the user wishes to see the source code for the webpage being viewed, then a series of source code pages 318 will be displayed. For example, there may be ten or more pages of source code for a very simple webpage presentation. The source code pages will also typically be presented in full-page format so that one page of the source code listing will take up the entire screen. If a user were interested in the source code used to effect the presentation of the word "Austin, TX" 320 on the screen display, the user would have to visually scan or do a "search" function through the series of pages of source code 318 to find the words "Austin, TX". This is extremely time consuming and tedious. Further, the user is not enabled to view the screen content and the underlying source code on the same screen and if source code changes are desired to be made by the user, much switching between the content page and the source code page is required.

Figure 4:
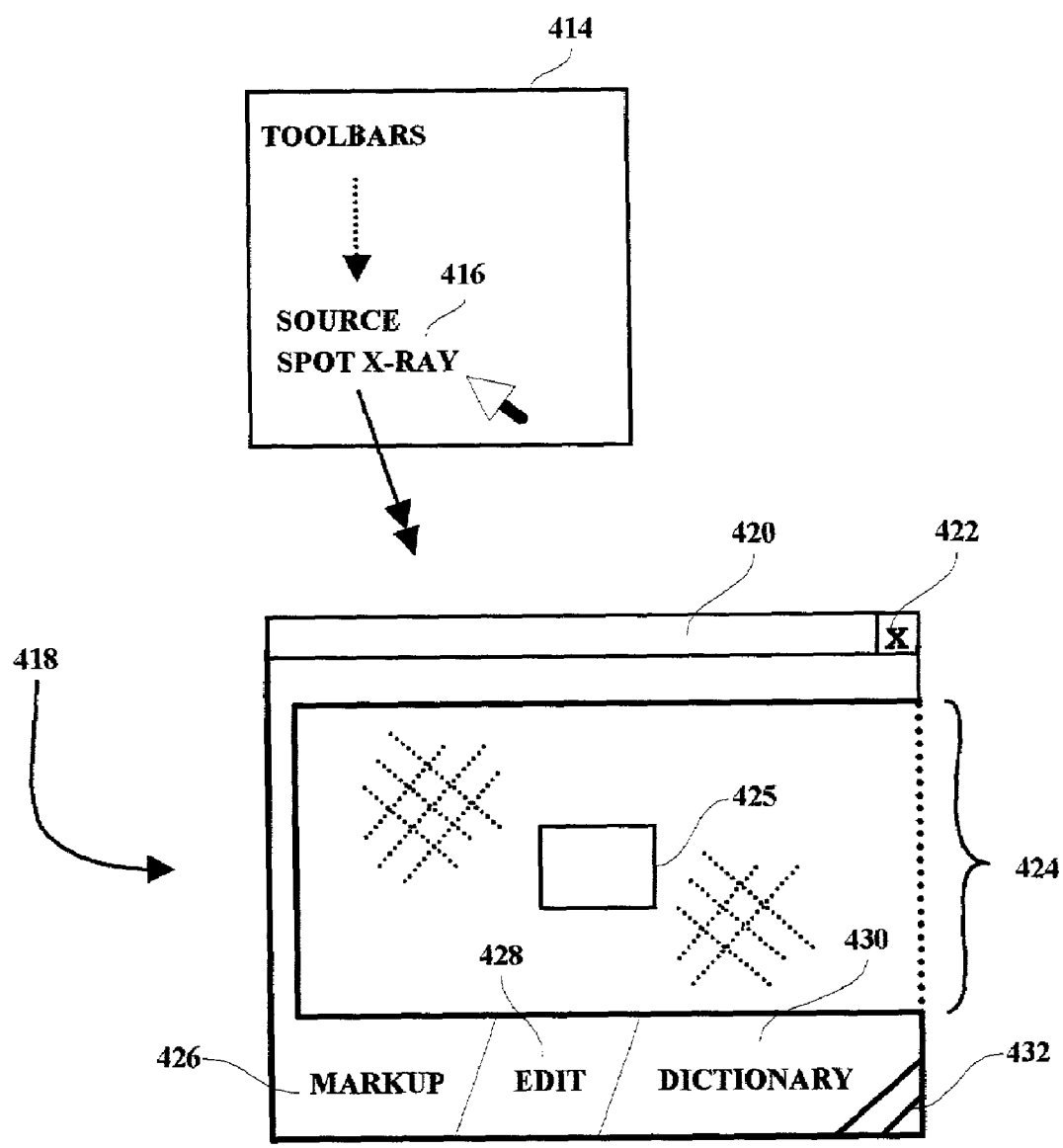
FIG. 4 is an illustration showing one exemplary embodiment of a GUI in accordance with the present invention.

As shown in FIG. 4, in one embodiment of the present invention, the selection screen 414 enables a user to select a "spot X-ray" selection 416. As noted earlier, the code implementing the present invention in the exemplary embodiment is illustrated as part of a browser program although it is understood that the present invention may also be implemented in many other forms including a stand-alone application. When the "SPOT X-RAY" selection is made, a source code graphical user interface (GUI) 418 is presented which enables the user to view source code for particular screen areas or spots indicated by the user.

The exemplary GUI 418 includes a grab bar 420 which is used to grab the GUI by pointing to the bar and holding the mouse switch down while moving the GUI to selected locations on a content screen. The GUI 418 also includes a termination button 422 which is used to terminate the GUI function. The exemplary GUI is generally in the shape of the letter "C" and includes a translucent area 424 which takes up the area inside of the letter "C", except for a selection window or "hot-spot" 425. The hot-spot 425 provides a clear (non-translucent) view of the screen content underlying the hot spot 425 of the GUI 418 while the translucent area 424 provides a relatively dimmed view of the screen content underlying the translucent area 424. The diminished intensity of the translucent area 424 compared to the full intensity view through the hot-spot 425 provides a user with a concurrent view of the source code relative to the screen content created by the source code being viewed, as is hereinafter more fully explained. As the GUI is moved around a content screen, the hot-spot will enclose different screen areas of interest, and automatically tie into or become associated with the underlying source code relating to the highlighted spot. The GUI 418 further includes various functions, including MARKUP 426, EDIT 428 and DICTIONARY 430 which may be selected by the user to perform the selected function to the source code associated with the selected hot-spot screen content. Additional function tabs may also be included. A sizing corner 432 may also be used in a "point-and-drag" technique to adjust the size of the GUI relative to the content screen being viewed.

Figure 5A:
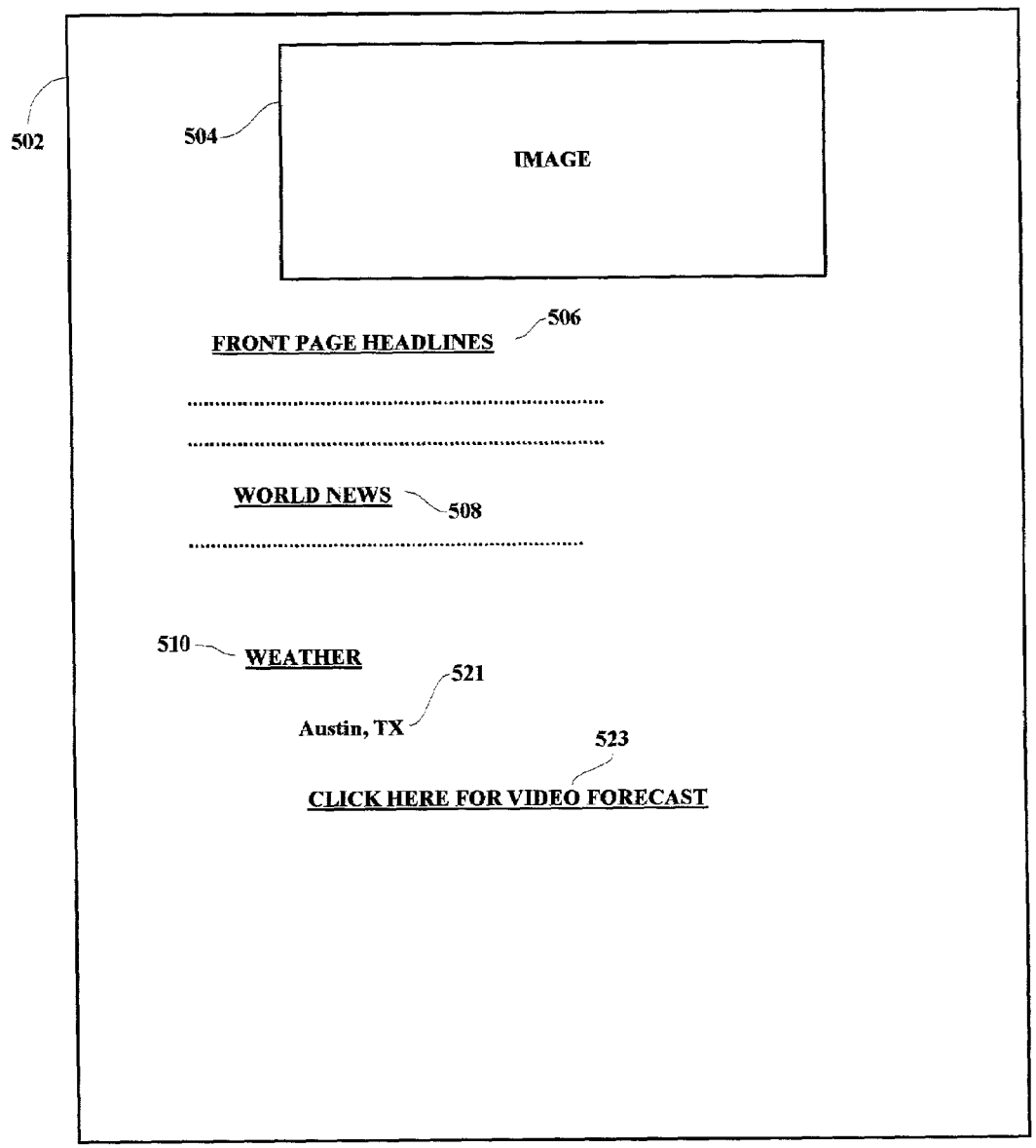
FIGS. 5A and 5B are used to illustrate an exemplary webpage screen with the source code GUI overlaid thereon.
Figure 5B:
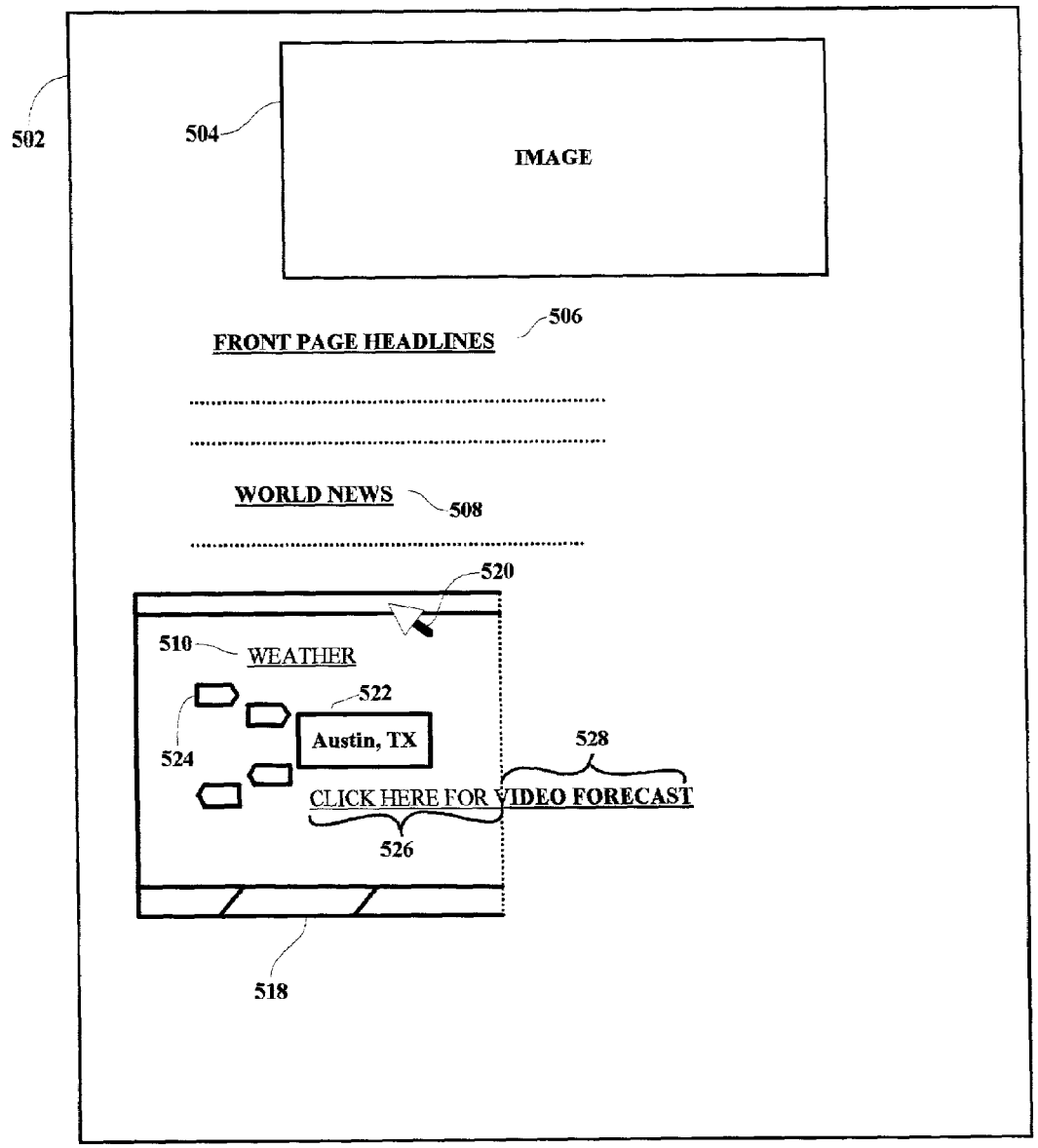

FIGS. 5A and 5B illustrate how the GUI 518 is overlaid upon an exemplary content screen 502. In FIGS. 5A and 5B, like reference indicia refer to like parts. In FIG. 5A, an exemplary webpage content screen includes an image 504 and several sub-sections, such as "FRONT PAGE HEADLINES" 506, "WORLD NEWS" 508 and "WEATHER" 510. Typically, hypertext words in the sub-sections may be clicked on or selected to view additional informational details. The webpage also shows the text "Austin, TX" 521 and the text "CLICK HERE FOR VIDEO FORECAST" 523. FIG. 5B shows the same webpage 502 with the addition of the source code GUI 518. As shown, the hypertext "WORLD NEWS" 508 is not within the GUI 518 and is displayed in normal intensity or contrast, while the hypertext "WEATHER" 510 is within the GUI 518 and is displayed through the translucent window of the GUI 518 in diminished intensity. Further, the words "Austin, TX" are shown through the "clear" hot-spot window 522 in normal intensity. It is noted that if an element is larger that the size of the hot-spot window 522, then the hot-spot window will automatically change its size to accommodate the size of the underlying element. The hot-spot will lock-on to an element when the hot-spot window is positioned within a predetermined range of the element. The hot-spot display may also use other means (e.g. greater than normal intensity, different colors etc.) to highlight the screen area enclosed by the hot-spot and selected by the user. It is noted that in the exemplary embodiment, one side of the GUI 518 is "open-ended" to provide a desired orientation effect relative to the content screen. To illustrate, the phrase "CLICK HERE FOR VIDEO FORECAST" is presented on the content screen and the GUI 518 is in a position partially overlaying the phrase. As illustrated, the portion of the phrase "CLICK HERE FOR" 526 is under the GUI in diminished intensity while the portion "VIDEO FORECAST" 528 is outside of the GUI 518 and presented in full or normal intensity. The GUI 518 also includes a series of marking indicia or source code markers, such as marker 524, for indicating various hierarchical points of the source code associated with screen area within the hot-spot 522. When a user wishes to view the source code associated with a selected hot-spot screen area, the user will click on one of the markers and the associated source code will be presented on the display screen. The source code presentation will be presented in a window (e.g. FIG. 7) which may be within or close to the GUI 518. In the example, the "MARKUP" function 426 has been selected by the user. The MARKUP function abbreviates the underlying HTML by using markers for easy viewing. A "+" sign is used to indicate that there is additional detail for viewing and the user may click on the "+" marker to view the additional code. The present invention may also be practiced without the markers such as 524, in which case the source code segment, to a predetermined expanse or breadth, will be presented in a separate code window, within or close to the GUI 518, in response to the element enclosed by the element selection window or hot-spot 522.

Figures 6, 7:
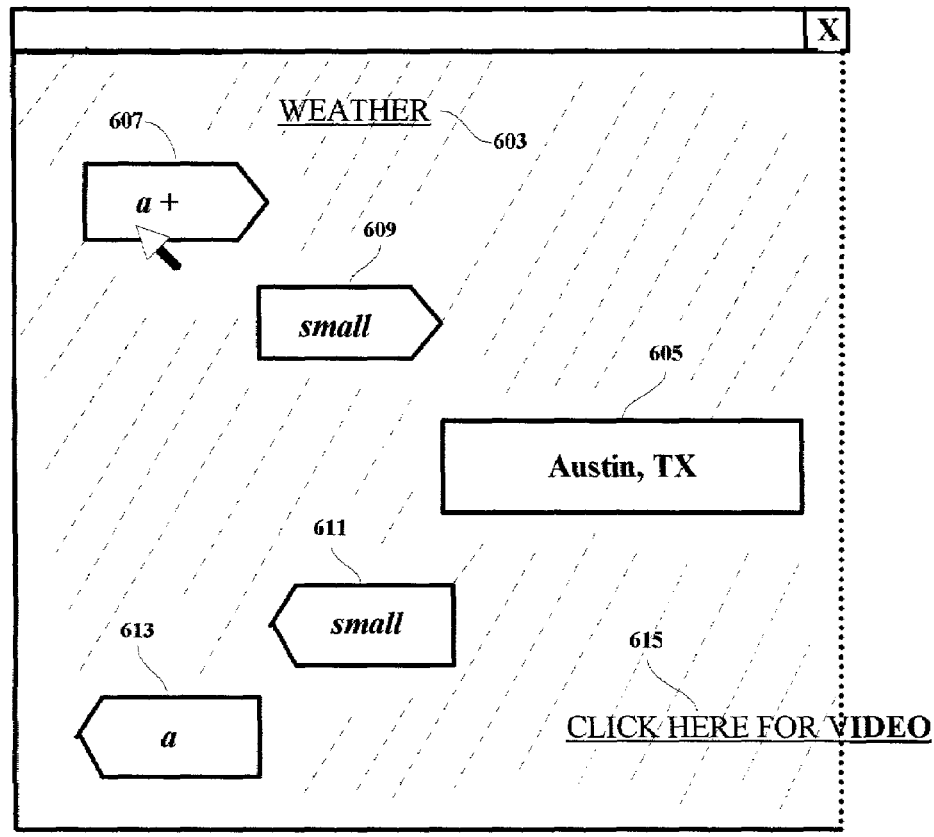
FIG. 6 is a more detailed view of the source code GUI shown in FIG. 5.
FIG. 7 is an exemplary embodiment of a section of source code relating to a portion of the display screen shown in FIG. 5.

A more detailed view of the GUI is shown in FIG. 6. As shown, the hot-spot 605 includes the words "Austin, TX" in normal screen intensity, while the word "WEATHER" 603 and the words "CLICK HERE FOR" 615 are shown through the translucent area of the GUI in diminished intensity. FIG. 6 also shows four markers labeled "a+" 607, "small" 609, "small" 611 and "a" 613. The number of markers appearing at any one time will vary depending upon the underlying code structure and hierarchy for the hot-spot highlighted content. In the example presented, when a user clicks on the marker 607, the source code associated with the "Austin, TX" hot-spot content will appear as shown in FIG. 7. As shown in the exemplary code, the words "Austin, TX" are within the "small" designators and the higher context is within the "a" designators. In a simpler embodiment, a user may point to an element in a display screen presentation, and the source code segment associated only with the identified element is selectively presented, for example, within an overlaid window to the user.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for viewing source code which is effective when executed to cause a presentation of information on a display screen, said method comprising:

effecting said presentation of information on said display screen;

displaying a graphical user interface (GUI) overlaying part of said information on said display screen;

indicating a selected portion of said information presented on said display screen by moving said GUI to said selected portion on said display screen; and displaying only a portion of said source code, said portion of said source code being executable to cause a presentation of said selected portion of said information presented on said display screen as indicated by said GUI, wherein said GUI is selectively invoked to overlay said selected portion of said information presented on said display screen, said GUI including a selection device for indicating said selected portion of said information, wherein said GUI further includes marking indicia, said marking indicia being representative of hierarchical points of reference of said source code, wherein said marking indicia are selectively chosen by said user to effect a display of a corresponding hierarchical level of said source code.

2. The method as set forth in claim 1 wherein said indicating is accomplished using a pointer device operated by a user, said pointer device being selectively movable by said user to point to and move said GUI to said selected portion of said information presented on said display screen.

3. The method as set forth in claim 1 wherein said GUI includes a translucent area through which said selected portion of said information presented on said display screen is viewable.

4. The method as set forth in claim 1 wherein said GUI includes a selection window for viewing said selected portion of said information.

5. The method as set forth in claim 4 wherein said selection window is fixed relative to said GUI, said GUI being selectively movable by said user to cause a corresponding movement of said selection window over said display screen.

6. The method as set forth in claim 5 wherein said selection window is operable to vary in size to accommodate various sizes of said selected portion of said information.

7. The method as set forth in claim 6 wherein said selection window automatically varies in size to accommodate a selected portion of said information closest to said selection window.

8. The method as set forth in claim 3 wherein said translucent area is arranged to present content viewed through said translucent area in a format different from content viewed through said selection window.

9. The method as set forth in claim 3 wherein said translucent area is arranged for viewing said selected portion of said information presented on said display screen at a diminished intensity level relative to other information presented on said display screen.

10. The method as set forth in claim 1 wherein said GUI further includes a series of function items, said function items being selectable by said user to perform operations on said portion of said source code corresponding to a selected function item.

11. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being effective to enable a viewing of source code which is effective when executed to cause a presentation of information on a display screen, said program signals being selectively operable to accomplish the steps of:

effecting said presentation of information on said display screen;

displaying a graphical user interface (GUI) overlaying part of said information on said display screen;

indicating a selected portion of said information presented on said display screen by moving said GUI to said selected portion on said display screen; and displaying only a portion of said source code, said portion of said source code being executable to cause a presentation of said selected portion of said information presented on said display screen as indicated by said GUI, wherein said GUI is selectively invoked to overlay said selected portion of said information presented on said display screen, said GUI including a selection device for indicating said selected portion of said information, wherein said GUI further includes marking indicia, said marking indicia being representative of hierarchical points of reference of said source code, wherein said marking indicia are selectively chosen by said user to effect a display of a corresponding hierarchical level of said source code.

12. The medium as set forth in claim 11 wherein said indicating is accomplished using a pointer device operated by a user, said pointer device being selectively movable by said user to point to and move said GUI to said selected portion of said information presented on said display screen.

13. The medium as set forth in claim 11 wherein said GUI includes a translucent area through which said selected portion of said information presented on said display screen is viewable.

14. The medium as set forth in claim 11 wherein said GUI includes a selection window for viewing said selected portion of said information.

15. The medium as set forth in claim 14 wherein said selection window is fixed relative to said GUI, said GUI being selectively movable by said user to cause a corresponding movement of said selection window over said display screen.

16. The medium as set forth in claim 15 wherein said selection window is operable to vary in size to accommodate various sizes of said selected portion of said information.

17. The medium as set forth in claim 16 wherein said selection window automatically varies in size to accommodate a selected portion of said information closest to said selection window.

18. The medium as set forth in claim 13 wherein said translucent area is arranged to present content viewed through said translucent area in a format different from content viewed through said selection window.

19. The medium as set forth in claim 13 wherein said translucent area is arranged for viewing said selected portion of said information presented on said display screen at a diminished intensity level relative to other information presented on said display screen.

20. The medium as set forth in claim 11 wherein said GUI further includes a series of function items, said function items being selectable by said user to perform operations on said portion of said source code corresponding to a selected function item.

21. A computer system comprising:

a system bus;

a central processing unit coupled to said system bus;

a display device coupled to said system bus, said display device including a display screen;

a user input device connected to said system bus, said user input device being arranged to enable user input to said computer system, said computer system being selectively operable to enable a viewing of source code which is effective when executed to cause a presentation of information on said display screen, said user input device being selectively operable for indicating a selected portion of said information presented on said display screen by moving a graphical user interface (GUI) to said selected portion on said display screen, and displaying only a portion of said source code, said portion of said source code being executable to cause a presentation of said selected information on said display screen, wherein said GUI is selectively invoked to overlay said selected portion of said information presented on said display screen, said GUI including a selection device for indicating said selected portion of said information, wherein said GUI further includes marking indicia, said marking indicia being representative of hierarchical points of reference of said source code, wherein said marking indicia are selectively chosen by said user to effect a display of a corresponding hierarchical level of said source code.

* * * * *